Nov. 3, 1959     P. F. FERREIRA     2,911,208
SPRING SUSPENSION FOR VEHICLES
Filed Aug. 15, 1958     2 Sheets-Sheet 1
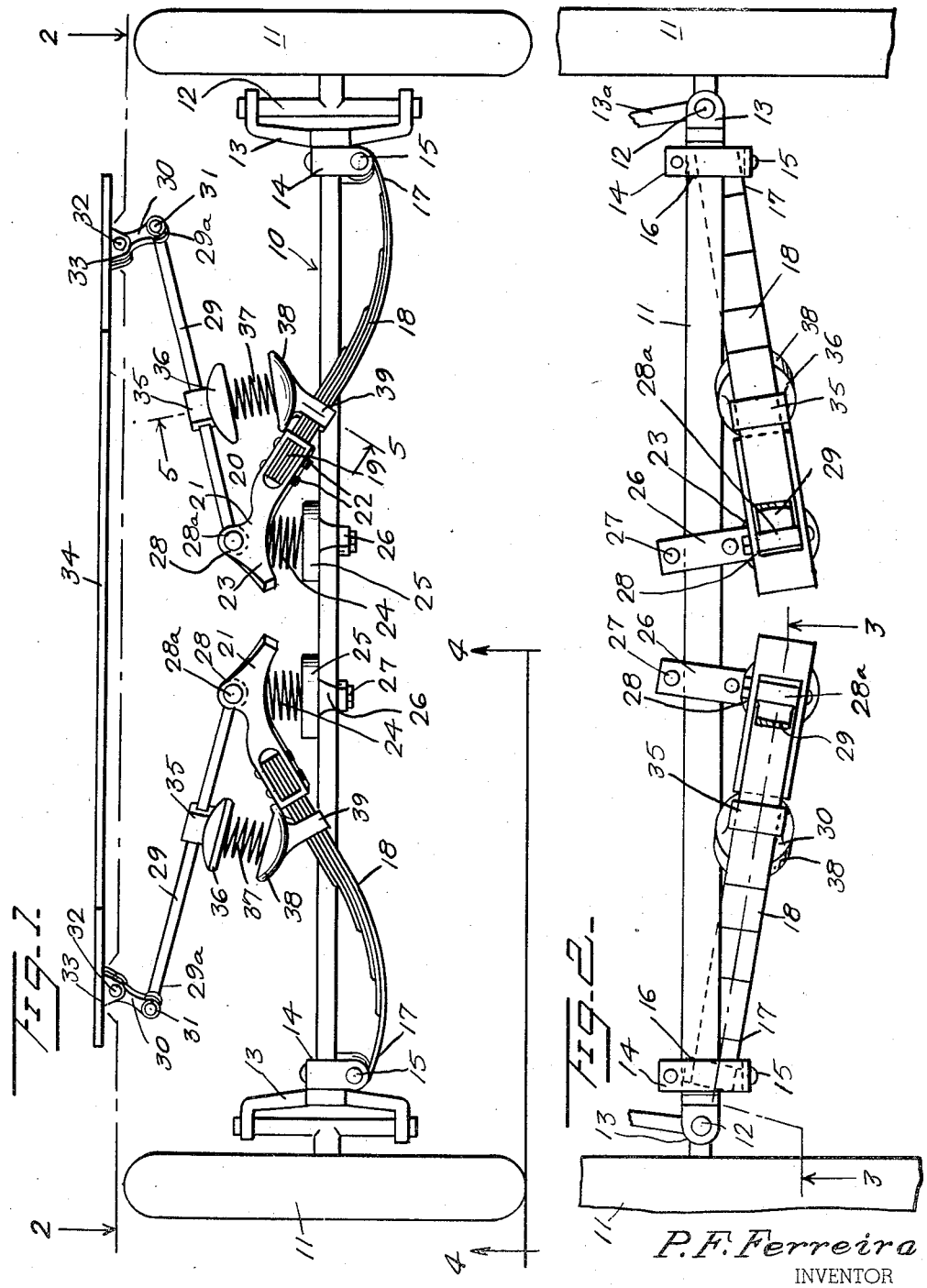
P. F. Ferreira
INVENTOR
BY *C. A. Knowles.*
ATTORNEYS.

Nov. 3, 1959   P. F. FERREIRA   2,911,208
SPRING SUSPENSION FOR VEHICLES
Filed Aug. 15, 1958   2 Sheets-Sheet 2
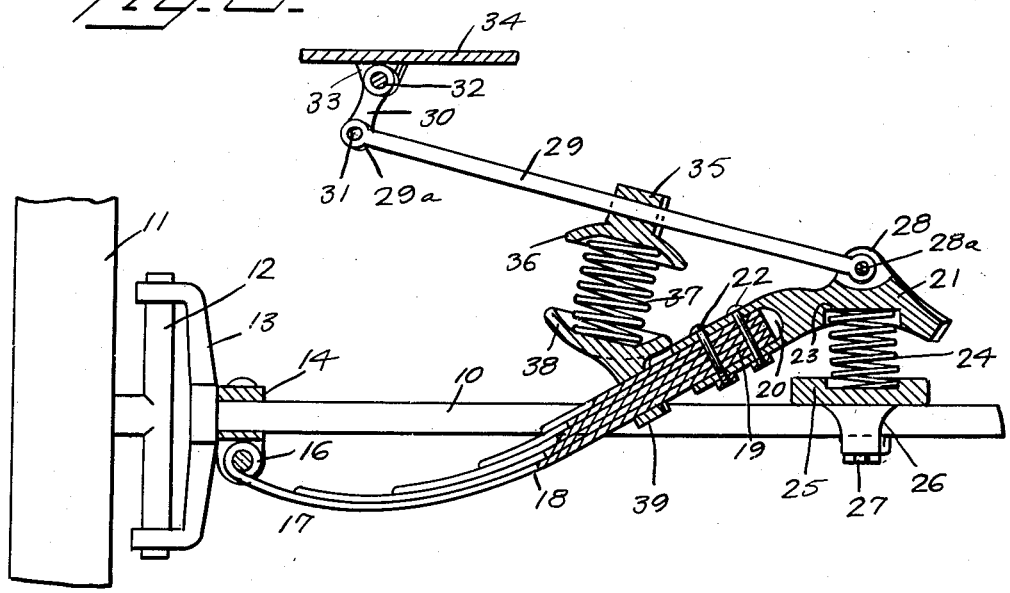
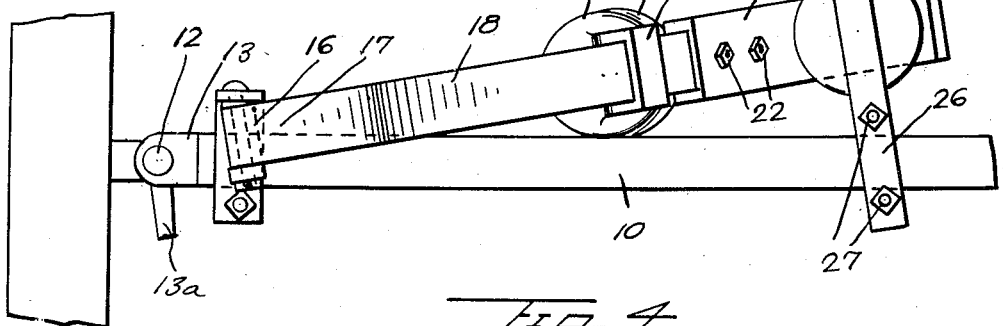
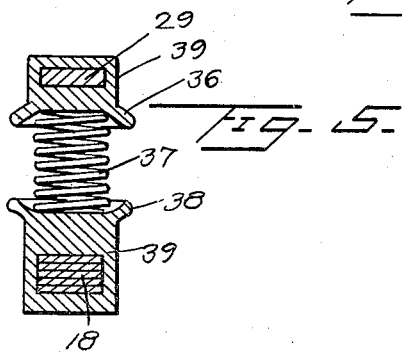
P.F. Ferreira
INVENTOR
BY *C.A. Snow & Co.*
ATTORNEYS.

United States Patent Office 2,911,208
Patented Nov. 3, 1959

2,911,208

SPRING SUSPENSION FOR VEHICLES

Paul F. Ferreira, Honolulu, Hawaii

Application August 15, 1958, Serial No. 755,336

4 Claims. (Cl. 267—17)

This invention relates to an improved spring suspension for vehicles, and has as its primary object the provision of a spring suspension adapted particularly for automobiles or trucks characterized by quarter-elliptical spring sections pivotally supported at a multiplicity of points for the provision of improved suspension.

An additional object of the invention is the provision of such a spring system supplemented by spaced coiled springs, positioned between quarter-elliptical springs and pivoted suspension levers therefor, and additional coiled springs supporting one of the pivot points of the pivotal connections of the quarter-elliptical springs.

An additional object of the invention is the provision of a spring suspension system which will readily absorb impact against either wheel of the vehicle relatively independently, and which may be employed to minimize such impact as transmitted to the vehicle frame.

An additional object of the invention is the provision of such a spring suspension system which is sturdy and durable in construction, reliable and efficient in operation, and relatively simple and inexpensive to manufacture, assemble and utilize.

Still other objects reside in the combinations of elements, features of construction, and arrangements of parts, all as will be more fully pointed out hereinafter and disclosed in the accompanying drawings wherein there is shown a preferred embodiment of this inventive concept.

In the drawings:

Figure 1 is a front plan view of one form of spring suspension arrangement embodying features of the instant invention shown as applied to the front wheel of an automobile.

Fig. 2 is a sectional view taken substantially along the line 2—2 of Fig. 1 as viewed in the direction indicated by the arrows.

Fig. 3 is an enlarged sectional view taken substantially along the line 3—3 of Fig. 2 as viewed in the direction indicated by the arrows.

Fig. 4 is an enlarged bottom plan view taken substantially along the line 4—4 of Fig. 1 as viewed in the direction indicated by the arrows, and Fig. 5 is a sectional view taken substantially along the line 5—5 of Fig. 1 as viewed in the direction indicated by the arrows.

Similar reference characters refer to similar parts throughout the several views of the drawings.

Having reference now to the drawings in detail, there is generally indicated at 10 the front axle of a motor vehicle, such as an automobile, which carries at either end wheels 11, which are mounted on conventional steering knuckles 12 pivotally supported in brackets 13, and adapted to be actuated by steering arms 13a, in the conventional manner. The axle 10 carries adjacent each bracket 13 a bracket 14, which is provided with a transverse pin 15, which carries an angularly disposed sleeve 16, which serves as a pivot for the smaller end 17 of a quarter-elliptical spring 18. The other end of the spring 18, or the thick end 19 thereof is supported in a socket 20 of an extension member 21, being secured in position as by means of bolts or rivets 22. The extension 21 is provided on its under side with a circular socket member 23, which serves as a seat for one end of a compression spring 24. The other end of spring 24 seats in a cup or socket 25, which is mounted on an extending bracket 26, which in turn is secured as by means of bolts 27 to the axle 10. The upper side of the extension 21 carries a pair of ears 28, which pivotally support a sleeve 28a, which is fixed to one end of an arm or lever 29. The other end of the arm 29 terminates in the sleeve 29a, which is pivotally connected to one end of a shackle 30 as by means of a pin 31. The other end of the shackle 30 is pivotally mounted on a pin 32, which is carried by lugs 33 which depend from a suitable transverse member 34, which comprises an integral part of the vehicle frame, the arrangement being such that the pins 32 form the direct connections between the frame and the spring assembly.

Each arm 29 carries at an intermediate point a bracket 35, which supports a cup or socket 36, which serves as a seat for one end of a compression spring 37, the other end of which is adapted to be supported in a cup or socket 38, which in turn is supported on a bracket member 39 which is fixedly secured about the quarter spring 18 at a point adjacent the socket 20.

From the foregoing the operation of the device should now be readily understandable.

The vehicle weight at 36 is carried by shackle link 30 to sleeve 29a and arm 29. The weight is absorbed by compression of the coil spring 37 which transmits the tension to socket or housing 38, in turn causing the quarter-elliptic spring 18 to absorb the weight since it is suspended at 16. This provides a leverage action with the coil spring 37 acting as a fulcrum.

The lever 29 is free to turn on the sleeve housing or bearing 28a and through spring extension 21 provide the solid operating base for the quarter-elliptic spring 18 to allow the leverage action. This leverage action suspending the weight of the vehicle at 16 presents a free suspension at spring extension 21. Coil spring 24 does not absorb any weight. This coil spring 24 rests in the sockets at 23 and 25. In other words, the coil spring 21 rests on the axle 16 and fits into the socket 21 without any compression.

When a wheel 11 is forced upward, the axle 10 moves upward and the quarter-elliptic spring assembly 18 absorbs the displacement of the axle 10, and the coil spring 24 in turn is compressed by action of the axle. The compression of coil spring 24 forces upward the extension 21 in a lesser action than that taking place at pivot 12 or the point of impact, but it raises the lever 21 at pivot point 28a thus releasing some of the pressure absorbed by coil spring 37 due to the impact at point 16 or counterbalancing the wheel impact.

The action of coil spring 24 raises the lever 29 at pivot 28a forcing the lever at pivot 31 to move or slide outward and retaining most of the original and neutral level of the vehicle.

While there is herein shown a front spring suspension, it will be readily understood that the spring suspension assembly may be equally applied to a rear axle, or conversely may be extended longitudinally of the vehicle from a front to a rear axle if desired.

From the foregoing it will now be seen that there is herein provided an improved spring suspension system which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. In a spring suspension assembly for a vehicle having a frame and an axle, a leaf spring pivotally connected at one end to the under side of an end of said axle, said spring being offset in relation to said axle, an arm pivotally connected at one of its ends to the other end of said leaf spring at a point adjacent the center of said axle, a pivoted connection between the other end of said arm and a portion of said frame substantially overlying said end of said axle, spring means positioned between said other end of said leaf spring and said axle, and additional spring means between an intermediate point of said arm and an intermediate point of said leaf spring.

2. The structure of claim 1 wherein said other end of said arm is pivotally connected to one end of a link, and the other end of said link is pivotally connected to said frame.

3. The structure of claim 2 wherein said spring means and said additional spring means each comprises a coil spring.

4. The structure of claim 1 wherein said leaf spring is quarter-elliptical and has a thinner end connected to said end of said axle.

References Cited in the file of this patent

UNITED STATES PATENTS

| | | |
|---|---|---|
| 1,207,144 | Delory | Dec. 5, 1916 |
| 1,356,533 | Leager | Oct. 26, 1920 |
| 2,005,513 | Weaver | June 18, 1935 |